US009227520B2

(12) United States Patent
Kimura et al.

(10) Patent No.: US 9,227,520 B2
(45) Date of Patent: Jan. 5, 2016

(54) ELECTRIC VEHICLE CHARGING DEVICE

(75) Inventors: Norihiko Kimura, Kanagawa (JP);
Kenji Sugihara, Tokyo (JP); Tomohiro Terada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 347 days.

(21) Appl. No.: 13/880,523

(22) PCT Filed: Oct. 20, 2011

(86) PCT No.: PCT/JP2011/005898
§ 371 (c)(1),
(2), (4) Date: Apr. 19, 2013

(87) PCT Pub. No.: WO2012/053221
PCT Pub. Date: Apr. 26, 2012

(65) Prior Publication Data
US 2013/0193923 A1 Aug. 1, 2013

(30) Foreign Application Priority Data

Oct. 20, 2010 (JP) ................. 2010-235335

(51) Int. Cl.
*H02J 7/00* (2006.01)
*B60L 11/00* (2006.01)
(Continued)

(52) U.S. Cl.
CPC ........ *B60L 11/1818* (2013.01); *H01R 13/6275* (2013.01); *H01R 13/635* (2013.01);
(Continued)

(58) Field of Classification Search
CPC .. H01R 13/66; H01R 13/639; H01R 13/6205; H02J 7/025; H01F 38/14; B60L 11/182
USPC ................. 320/109, 108; 439/138, 141, 304; 701/22, 36; 180/65.29
See application file for complete search history.

(56) References Cited

U.S. PATENT DOCUMENTS 4,109,989 A   8/1978  Snyder et al.
5,350,312 A   9/1994  Kuno et al.
(Continued)

FOREIGN PATENT DOCUMENTS

CN   1178402 A   4/1998
CN   2720674 A   8/2005
(Continued)

OTHER PUBLICATIONS

Extended European Search Report for Application No. 11834067.8 dated Mar. 25, 2015.
(Continued)

*Primary Examiner* — M'Baye Diao
(74) *Attorney, Agent, or Firm* — Pearne & Gordon LLP

(57) ABSTRACT

The purpose is to provide an electric vehicle charging device capable of preventing arc discharge when disconnecting a power supply connector and a vehicle-side connector. An electric vehicle charging device provided with: a power supply connector (3) for supplying electrical energy from outside the vehicle; a vehicle-side connector (2) for connecting to the power supply connector (3) and positioned in the vehicle; a spring (34) for generating repulsive force in the direction in which the power supply connector (3) and the vehicle-side connector (2) separate; and an engaging part (32) for detecting the disconnection of the power supply connector (3) and the vehicle-side connector (2); wherein the spring (34) generates repulsive force in the direction in which the power supply connector (3) and the vehicle-side connector (2) separate when the engaging part (32) detects that the power supply connector (3) and the vehicle-side connector (2) have disconnected.

10 Claims, 9 Drawing Sheets

(51) Int. Cl.
*G06F 7/00* (2006.01)
*H01R 13/44* (2006.01)
*H01R 13/62* (2006.01)
*B60L 11/18* (2006.01)
*H01R 13/635* (2006.01)
*H01R 13/627* (2006.01)
*H01M 10/42* (2006.01)
*H01R 13/53* (2006.01)
*H01M 10/46* (2006.01)

(52) U.S. Cl.
CPC .......... *B60L2270/32* (2013.01); *B60L 2270/34* (2013.01); *H01M 10/42* (2013.01); *H01M 10/46* (2013.01); *H01M 2220/20* (2013.01); *H01R 13/53* (2013.01); *H01R 2201/26* (2013.01); *Y02T 10/7005* (2013.01); *Y02T 90/14* (2013.01)

(56) References Cited

U.S. PATENT DOCUMENTS

| | | | |
|---|---|---|---|
| 5,478,249 | A | 12/1995 | Crestin |
| 5,490,790 | A | 2/1996 | Okada |
| 5,598,084 | A * | 1/1997 | Keith ............................ 320/109 |
| 5,790,976 | A * | 8/1998 | Boll et al. .................. 455/456.5 |
| 5,909,100 | A * | 6/1999 | Watanabe et al. ............. 320/108 |
| 2007/0184674 | A1 | 8/2007 | Koch |
| 2010/0204865 | A1* | 8/2010 | Nakamura ...................... 701/22 |
| 2010/0228413 | A1 | 9/2010 | Fujitake |
| 2011/0034053 | A1 | 2/2011 | Matsumoto et al. |
| 2011/0300733 | A1* | 12/2011 | Janarthanam et al. ........ 439/304 |
| 2012/0019203 | A1* | 1/2012 | Kressner ...................... 320/109 |
| 2012/0091954 | A1* | 4/2012 | Matsuki ....................... 320/109 |
| 2015/0069963 | A1* | 3/2015 | Ichikawa ..................... 320/108 |

FOREIGN PATENT DOCUMENTS

| | | |
|---|---|---|
| DE | 10333403 A1 | 9/2004 |
| JP | 04-334908 A | 11/1992 |
| JP | 06-310214 A | 11/1994 |
| JP | 07-006814 A | 1/1995 |
| JP | 10-262340 A | 9/1998 |
| JP | 2000-139031 A | 5/2000 |
| JP | 2002-075525 A | 3/2002 |
| JP | 2009-077535 A | 4/2009 |
| JP | 2010-123521 A | 6/2010 |
| JP | 2010-136494 A | 6/2010 |

OTHER PUBLICATIONS

Partial European Search Report for Application No. 11834067.8-1801/2631995 PCT/JP2011005898 dated Nov. 20, 2014.

Search Report for Chinese Patent Application No. 201180050865.3 dated Jan. 30, 2015.

International Search Report for Application No. PCT/JP2011/005898 dated Dec. 27, 2011.

English translation of the Search Report for Chinese Patent Application No. 2011800508653 dated Aug. 12, 2015.

* cited by examiner

ELECTRIC VEHICLE CHARGING DEVICE

TECHNICAL FIELD

The present invention relates to an electric vehicle charging apparatus including a vehicle-side connector for battery charging, and a feeder connector that supplies electric energy from outside of an electric vehicle.

BACKGROUND ART

With a view to realizing a low-carbon economy, there has been an interest in recent years in electric vehicles (EVs) that run solely by means of an electric motor, as well as in plug-in hybrid vehicles that are able to run by means of either of an engine and an electric motor.

Such electric vehicles and plug-in hybrid vehicles are equipped with an electric motor for generating a drive force that is transmitted to the tires. The energy for driving this electric motor is supplied from a battery on-board the vehicle. This battery is chargeable from outside of the vehicle. The term "electric vehicle" is hereinafter described as a concept inclusive of plug-in hybrid vehicles as well.

The battery is charged from outside of the vehicle by connecting a feeder connector, which a feeding stand installed externally to the vehicle is equipped with, to a vehicle-side connector that the vehicle has.

As related electric vehicle charging apparatuses, there are those where the connection state between a vehicle-side connector and a feeder connector is detected with a sensor, and where, based on the connection state detected by the sensor and on information regarding the powertrain of the electric vehicle, a control section of the electric vehicle effects control in such a manner as to separate the feeder connector and the vehicle-side connector if the electric vehicle tries to start moving while the feeder connector is still connected (e.g., Patent Literature 1).

CITATION LIST

Patent Literature

PTL 1
Japanese Patent Application Laid-Open No. 2010-136494

SUMMARY OF INVENTION

Technical Problem

Conventional electric vehicle charging apparatuses do not give specific consideration to how the separation of the feeder connector and the vehicle-side connector is to be carried out. Failing to consider how the separation is to be carried out results in such problems as the following.

When an electric vehicle tries to start moving while the feeder connector is still connected, the feeder connector and the vehicle-side connector are forcibly separated while the two are still connected. At this point, a voltage as high as several hundreds of volts is usually applied across the feeder connector and the vehicle-side connector. As the feeder connector and the vehicle-side connector become disengaged, the gas molecules between the electrodes become ionized, causing a current to flow. Consequently, an arc discharge occurs, where a current flows through gas, which is normally nonconductive. When arc discharge occurs, it poses a risk since it can possibly cause damage to the surroundings.

An object of the present invention is to provide an electric vehicle charging apparatus capable of preventing the occurrence of an arc discharge when a feeder connector and a vehicle-side connector become disengaged.

Solution to Problem

With the present invention, if disengagement of a feeder connector and a vehicle-side connector from each other is detected by a disengagement detection section when the feeder connector and the vehicle-side connector are not in a state for detachment, the feeder connector and the vehicle-side connector are made to repel each other by means of a repulsion force.

Advantageous Effects of Invention

With an electric vehicle charging apparatus of the present invention, when a disengagement detection section detects disengagement of a feeder connector and a vehicle-side connector from each other, a repulsion force with such a directionality as to cause the feeder connector and the vehicle-side connector to break off from each other is generated, as a result of which the two connectors are quickly disengaged by means of the repulsion force. Such an arrangement produces an advantageous effect where it is possible to prevent the occurrence of an arc discharge.

Figure 1:
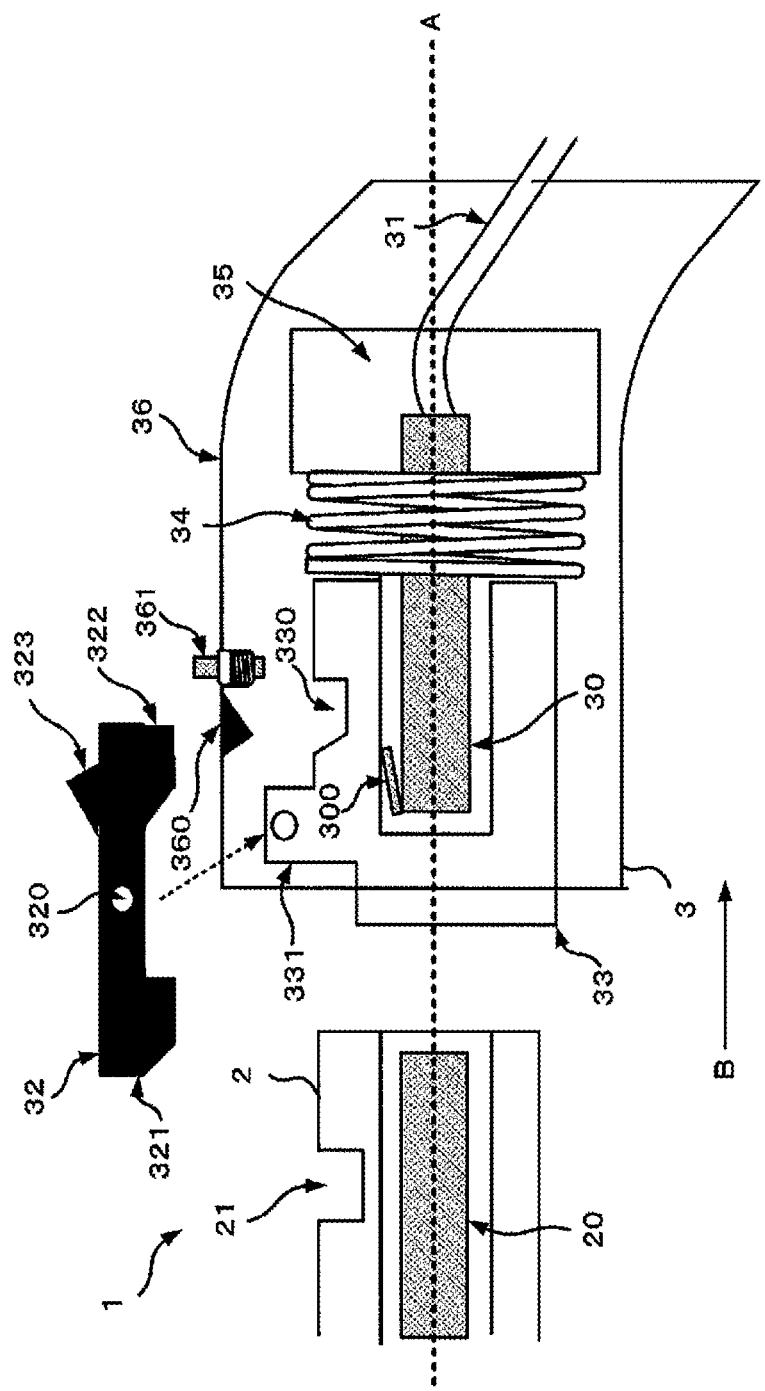
FIG. 1 is a diagram illustrating the structure of an electric vehicle charging apparatus with respect to Embodiment 1 of the present invention.
Figure 2:
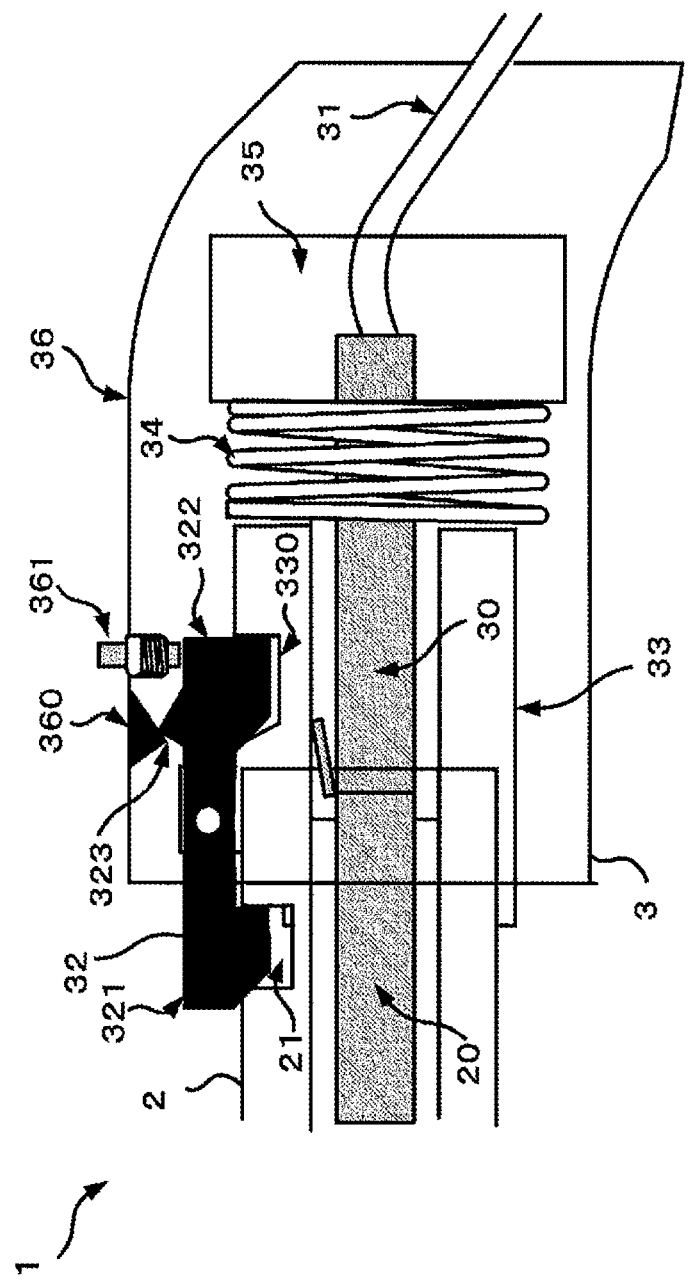
FIG. 2 is a diagram showing the structure of each section of an electric vehicle charging apparatus that is in the middle of charging with respect to Embodiment 1 of the present invention.
Figure 3:
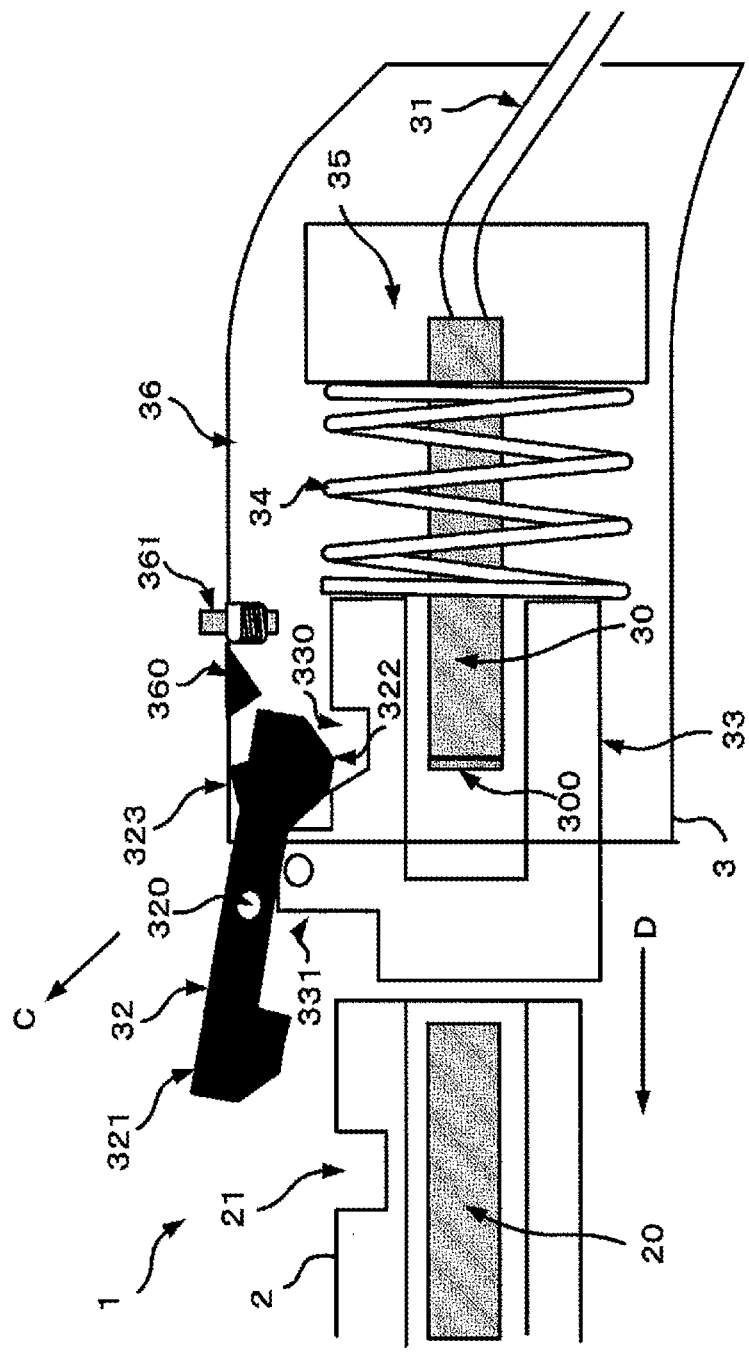
FIG. 3 is a diagram showing the structure of each section of an electric vehicle charging apparatus with respect to Embodiment 1 of the present invention where connectors have broken off from each other.

DESCRIPTION OF EMBODIMENTS (Embodiment 1)
An electric vehicle charging apparatus with respect to Embodiment 1 of the present invention is described below with reference to FIGS. 1 through 3. FIGS. 1 through 3 are diagrams each showing the structure of an electric vehicle charging apparatus with respect to Embodiment 1 of the present invention. FIG. 1 is a diagram of an electric vehicle charging apparatus with respect to Embodiment 1 of the present invention, where the various parts are shown disassembled. FIG. 2 is a diagram showing the structure of each section of an electric vehicle charging apparatus in the middle of charging with respect to Embodiment 1 of the present invention. FIG. 3 is a diagram showing the structure of each section of an electric vehicle charging apparatus with respect to Embodiment 1 of the present invention where connectors have broken off from each other.

The structure of each section is first described through FIG. 1. Electric vehicle charging apparatus I includes: feeder connector 3, which supplies electric energy from outside of the vehicle; and vehicle-side connector 2 that is disposed on the vehicle and that connects with feeder connector 3.

As feeder connector 3 and vehicle-side connector 2 connect with each other, electricity is supplied from feeder connector 3, and the battery mounted on the vehicle is charged.

Feeding connector 3 includes: spring 34 (corresponding to a repulsion force generation section) that generates a repulsion force with such a directionality as to cause feeder connector 3 and vehicle-side connector 2 to break off from each other; protrusion 323 and protrusion 360 that restrain the repulsion force generated by spring 34; latch section 32 (corresponding to a disengagement detection section) that lifts the restraint on the repulsion force generated by spring 34 upon disengagement of feeder connector 3 and vehicle-side connector 2 from each other. Each section is described in detail below.

Vehicle-side connector 2 includes conductive vehicle-side electrode 20, which is electrically connected to the battery mounted on the vehicle. Hole part 21 is formed in the outer circumference of the housing of vehicle-side connector 2. As discussed hereinbelow, this hole part 21 is used to secure vehicle-side connector 2 and feeder connector 3 to each other.

Feeder connector 3 includes: conductive feeder-side electrode 30, which transfers the electric energy that is to be supplied to the vehicle; and charging cable 31, which is electrically connected to this feeder-side electrode 30 and transfers the electricity from the charging stand.

Feeder connector 3 also includes: latch section 32, which secures feeder connector 3 and vehicle-side connector 2 to each other; protruding section 33 for causing feeder connector 3 and vehicle-side connector 2 to break off from each other; spring 34, which generates a repulsion force; base section 35, which secures spring 34; and feeder connector housing 36, which houses these members. Each section of feeding connector 3 is described in detail below.

Feeder-side electrode 30 is a conductive electrode that transfers the electric energy that is to be supplied to the vehicle, and is typically cylindrical. For purposes of illustration only, FIG. 1 shows one electrode. In reality, if AC electric energy is to be supplied, feeder-side electrode 30 may include three electrodes, namely two electrodes and one ground. On the other hand, if DC electric energy is to be supplied, feeder-side electrode 30 may include two electrodes, namely a positive electrode and a negative electrode.

Shielding section 300 is an insulating member for shielding feeder-side electrode 30 of feeder connector 3 so that it does not become exposed after feeder connector 3 and vehicle-side connector 2 have broken off from each other. Shielding section 300 may include an actuating mechanism (e.g., an electric motor, and/or the like) and automatically carry out shielding by sensing a break off between feeder connector 3 and vehicle-side connector 2, or it may automatically carry out shielding by means of a spring force, and/or the like, without using electric energy.

Charging cable 31 may be a cable including a conductive wire covered with an insulating material. To charging cable 31 is supplied an AC voltage of approximately 1.00 to 240 V from a household outlet, or, for example, a DC voltage of approximately 400 V from a charging stand.

Latch section 32 includes latch stop 321 and latch stop 322 for securing feeding connector 3 and vehicle-side connector 2 to each other. When feeder connector 3 and vehicle-side connector 2 are connected during charging, latch stop 321 engages with hole part 21 formed in vehicle-side connector 2, and latch stop 322 engages with hole 330 formed in protruding section 33, which is described hereinbelow.

Approximately halfway between latch stop 321 and latch stop 322 of latch section 32 is formed hole 320. On the side of latch section 32 facing feeder connector housing 36 is formed protrusion 323. Protrusion 323 engages with protrusion 360 formed on feeder connector housing 36. As feeder connector 3 and vehicle-side connector 2 become disengaged, this engagement becomes undone as is discussed hereinbelow. In other words, latch section 32 corresponds to a disengagement detection section.

Protruding section 33 is a member for causing feeder connector 3 and vehicle-side connector 2 to break off from each other. Protruding section 33 is in contact with spring 34 at one end, and the opposite end thereof is exposed on the side of feeder connector 3 that connects with vehicle-side connector 2. In the event of an abnormal state, such as when the vehicle starts moving during charging, for example, protruding section 33 protrudes forcefully, thereby breaking off vehicle-side connector 2.

Hole 330 and support section 331 are formed in/on protruding section 33. Hole 330 engages with latch stop 322 of latch section 32. Support section 331 is a part for securing latch section 32. A hole is formed in support section 331. The hole formed in support section 331 and hole 320 formed in latch section 32 are so located as to be concentric. A shaft that links the holes to each other is provided along the center axes thereof.

Latch section 32 and protruding section 33 are secured to each other by means of this shaft. Latch section 32 and feeder connector housing 36 are secured to each other by means of the engagement between protrusion 323 and protrusion 360. Thus, the repulsion force of spring 34 exerted on protruding section 33 is stored without being released.

The above-mentioned shaft is so structured that when a force of a predetermined magnitude or greater is applied thereto, the alignment between hole 320 and the hole formed in support section 331 is broken. Upon disengagement due to an abnormal state between feeder connector 3 and vehicle-side connector 2, the engagement between protrusion 323 and protrusion 360 becomes undone. As a result, due to the repulsion force of spring 34, protrusion section 3 protrudes towards vehicle-side connector 2. Due to this protruding action, feeder connector 3 and vehicle connector 2 break off from each other.

By means of a spring force, spring 34 generates a repulsion force with such a directionality as to cause feeder connector 3 and vehicle-side connector 2 to break off from each other. Spring 34 corresponds to a repulsion force generation section.

Spring 34 is formed by helically winding a metal wire, and stores a repulsion force when compressed. Spring 34 is so secured as to have one end in contact with base section 35, which is secured inside feeder connector housing 36, and repels in the opposite direction to the end that is in contact with base section 35.

Spring 34 contacts protruding section 33 at the opposite end to the end that is in contact with base section 35. As protruding section 33 is pushed in towards base section 35, spring 34 contracts and stores a repulsion force. The repulsion force stored by spring 34 is exerted on protruding section 33. However, this repulsion force is stored without being released due to the engagement between protrusion 323 formed on latch section 32 and protrusion 360 formed on feeder connector housing 36.

For spring 34, one may use not only those that use a metal, but also gas springs which utilize the elasticity of compressed gas, or liquid springs which utilize the elasticity of liquids.

Latch release section 361 is operated by the user. It is used in order to attach/detach vehicle-side connector 2 and feeder connector 3 to/from each other. Latch release section 361 may be, for example, a push switch where a shaft, which protrudes outward from within feeder connector housing 36, has its motion restricted by a spring force directed outward of feeder connector housing 36 from latch section 32.

To attach, latch stop 321 is first displaced in the direction away from hole part 21, after which feeder connector 3 is attached to vehicle-side connector 2. Latch stop 321 must then be made to engage with hole part 21. On the other hand, to detach, latch stop 321 is first displaced in the direction away from hole part 21, after which vehicle-side connector 2 and feeder connector 3 must be detached from each other.

Thus, as the user pushes latch release section 361, latch release section 361 applies pressure onto latch stop 322. As a result, latch stop 321 pivots about hole 320 in latch section 32 to be displaced in the direction away from hole part 21.

Each section of feeder connector 3 indicated above is housed inside feeder connector housing 36. Feeder connector housing 36 may be made of a reinforced resin with insulating properties. So long as it has insulating properties, a material other than reinforced resin may also be used for feeder connector housing 36. As discussed above, protrusion 360 is formed on the inner surface of feeder connector housing 36.

Next, the structure of each section is described through FIGS. 2 and 3.

FIG. 2 depicts a state where an electric vehicle is being charged from charging stand 5. Vehicle-side connector 2 and feeder connector 3 are connected.

Latch section 32 of feeder connector 3 is secured by engaging feeder connector 3 and vehicle-side connector 2 with each other. Specifically, latch stop 321 engages with hole part 21, and latch stop 322 engages with hole 330. As a result, feeder connector 3 and vehicle-side connector 2 are secured to each other.

The repulsion force stored in spring 34 is exerted on protruding section 33. However, this repulsion force is stored without being released because protrusion 323 formed on latch section 32 is engaged by protrusion 360 formed on feeder connector housing 36.

FIG. 3 depicts a state where vehicle-side connector 2 and feeder connector 3 have broken off from each other due to an abnormal state, such as when the electric vehicle starts moving during charging, for example. As feeder connector 3 and vehicle-side connector 2 become disengaged from each other, the engagement of latch section 32 becomes undone. As a result, the restraint on the repulsion force stored in spring 34 is released.

The releasing of the engagement of latch section 32 is carried out as follows. When vehicle-side connector 2 disengages from feeder connector 3, a force is exerted on latch stop 321 due to a displacement of hole part 21, and this force is transmitted to the shaft that links hole 320 formed in latch section 32 with the hole formed in support section 331. The above-mentioned shaft is so structured that when a force of a predetermined magnitude or greater is applied thereto, the alignment between hole 320 and the hole formed in support section 331 becomes undone. Consequently, latch section 32 becomes disengaged from protruding section 33, as a result of which the engagement between protrusion 323 and protrusion 360 also becomes undone. Because protruding section 33 is released from its immobilization by feeder connector housing 36, the repulsion force of spring 34 is released.

Due to this released repulsion force, protruding section 33 protrudes forcefully towards vehicle-side connector 2 from the side of feeder connector 3. The protruding force of protruding section 33 is then transmitted to vehicle-side connector 2, as a result of which vehicle-side connector 2 and feeder connector 3 break off from each other. In conjunction with this break off, shielding section 300 shields feeder-side electrode 30.

How great a repulsion force is to be stored in spring 34 is determined by how short the duration of arc generation is to be made. By way of example, let it be assumed that a break off distance of 5 mm or greater must be ensured within 100 msec. In this case, since the mass of feeder connector 3 is known, it is possible to calculate the minimum requisite repulsion force.

When spring 34 is made too large, the momentum with which vehicle-side connector 2 breaks off from feeder connector 3 becomes too large. In this case, the momentum with which feeder connector 3 breaks off poses a risk of interfering with people or objects in the vicinity. For this reason, it is preferable that the repulsion force to be stored in spring 34 be set in accordance with predetermined criteria such as those above.

Thus, with an electric vehicle charging apparatus of an embodiment of the present invention, as feeder connector 3 and vehicle-side connector 2 become disengaged, latch section 32, which is a disengagement detection section, lifts its restriction of the repulsion force generated by spring 34, which is a repulsion force generation section, as a result of which the two connectors rapidly break off from each other due to the repulsion force. Thus, an advantageous effect is produced where it is possible to prevent the occurrence of an arc discharge.

With the present embodiment, a repulsion force with such a directionality as to cause feeder connector 3 and vehicle-side connector 2 to break off from each other is generated from a repulsion force derived from the spring force of spring 34. However, the present invention is by no means limited as such, and a repulsion force may be generated through hydraulics.

With the present embodiment, feeder connector 3 is provided with the repulsion force of spring 34 and a mechanism for releasing this repulsion force. However, the present invention is by no means limited as such, and such mechanisms may instead be provided on the side of vehicle-side connector 2.

(Embodiment 2)

Figure 4:
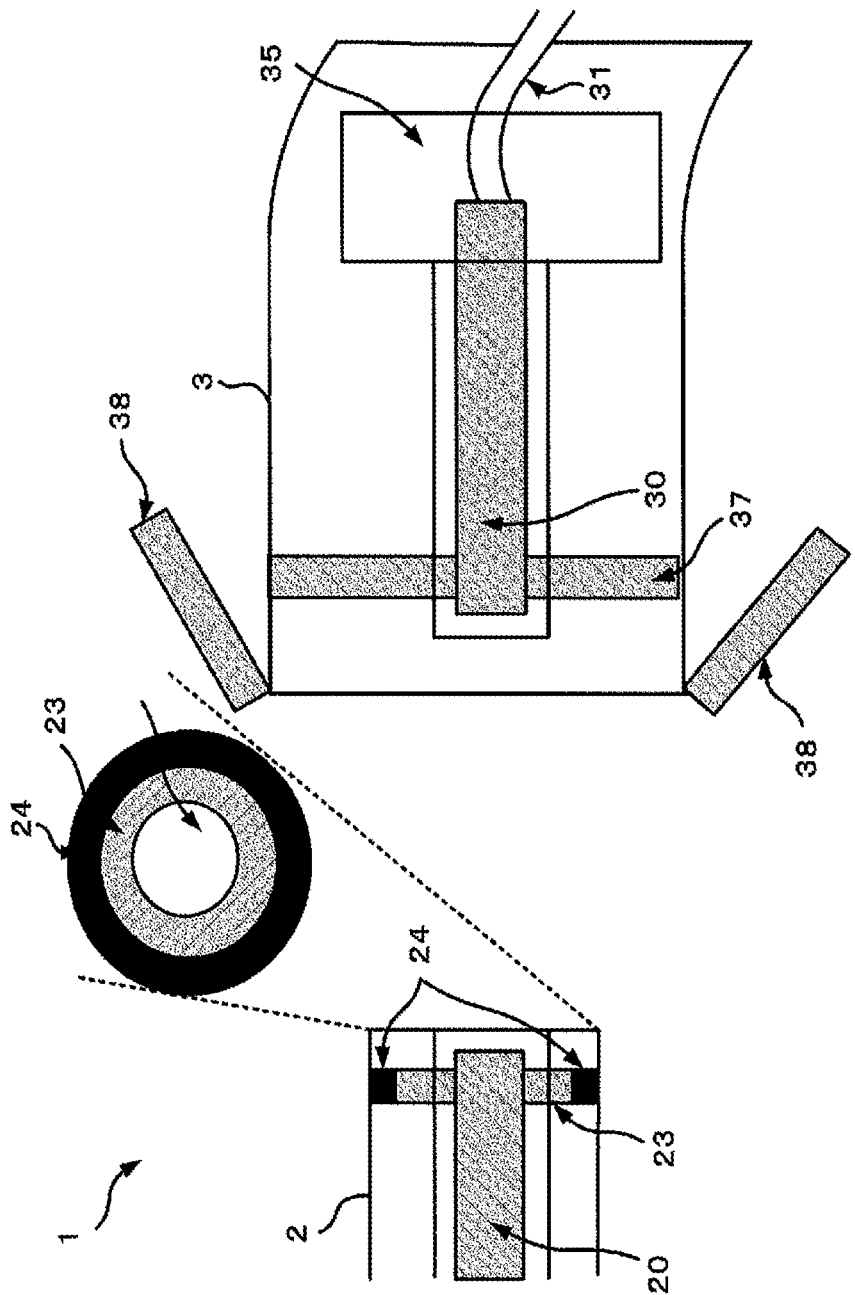
FIG. 4 is a diagram showing the structure of each section of an electric vehicle charging apparatus with respect to Embodiment 2 of the present invention.
Figure 5:
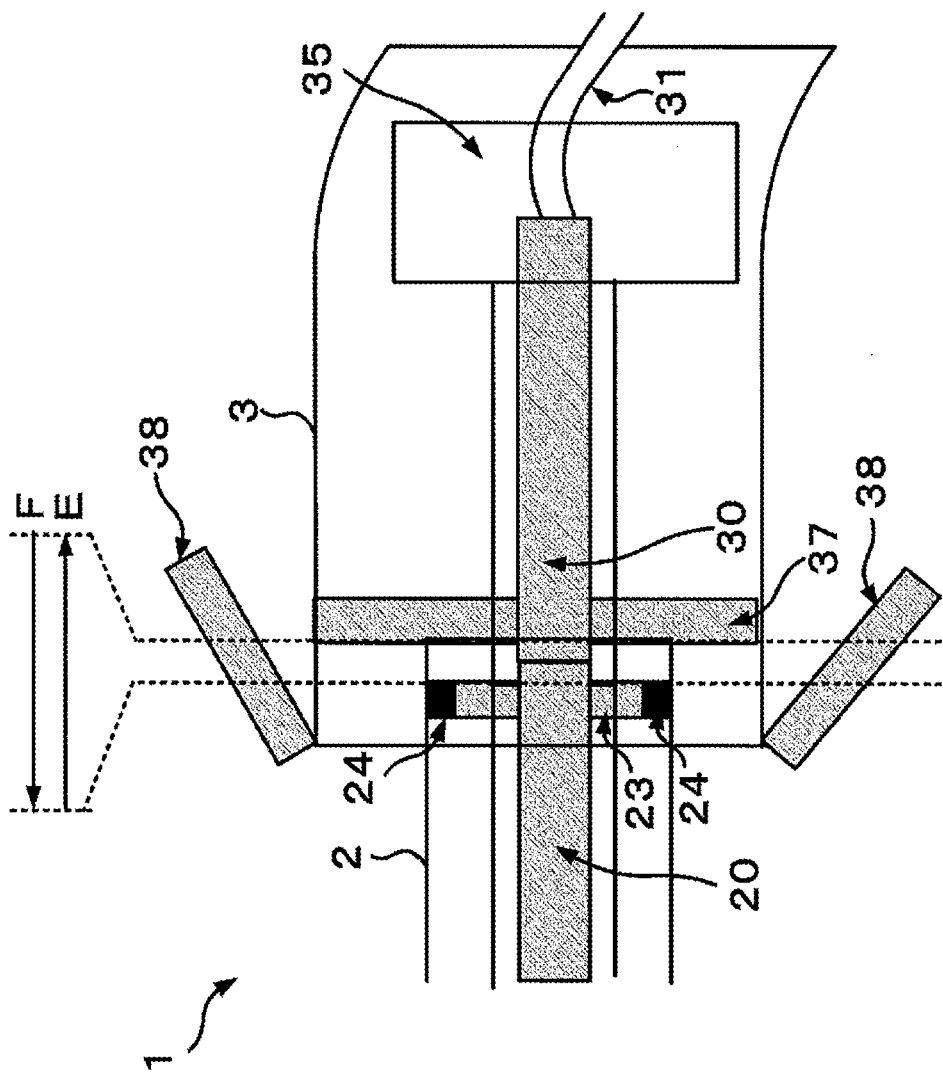
FIG. 5 is a diagram showing the structure of each section of an electric vehicle charging apparatus that is in the middle of charging with respect to Embodiment 2 of the present invention.
Figure 6:
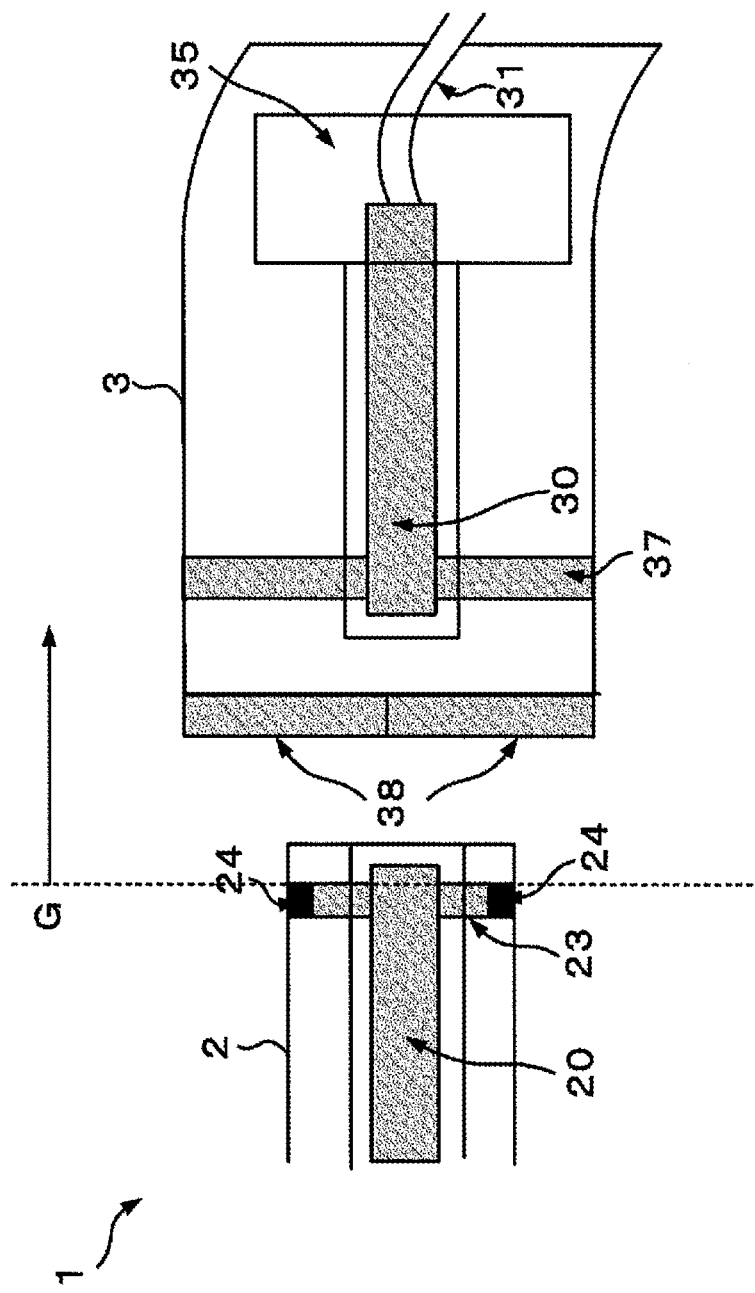
FIG. 6 is a diagram showing the structure of an electric vehicle charging apparatus with respect to Embodiment 2 of the present invention where connectors have broken off from each other.
Figure 7:
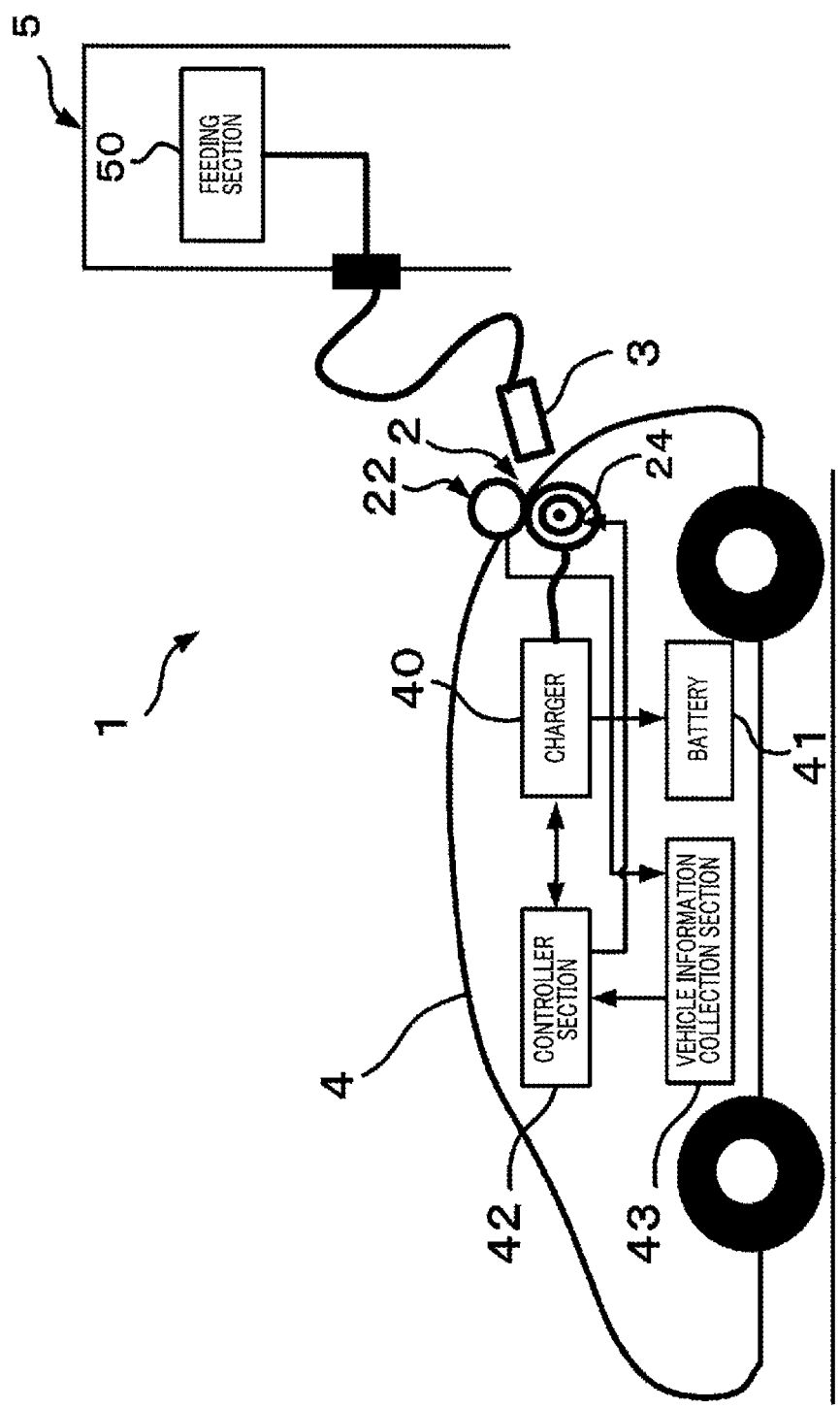
FIG. 7 is a block diagram of an electric vehicle charging apparatus with respect to Embodiment 2 of the present invention.
Figure 8:
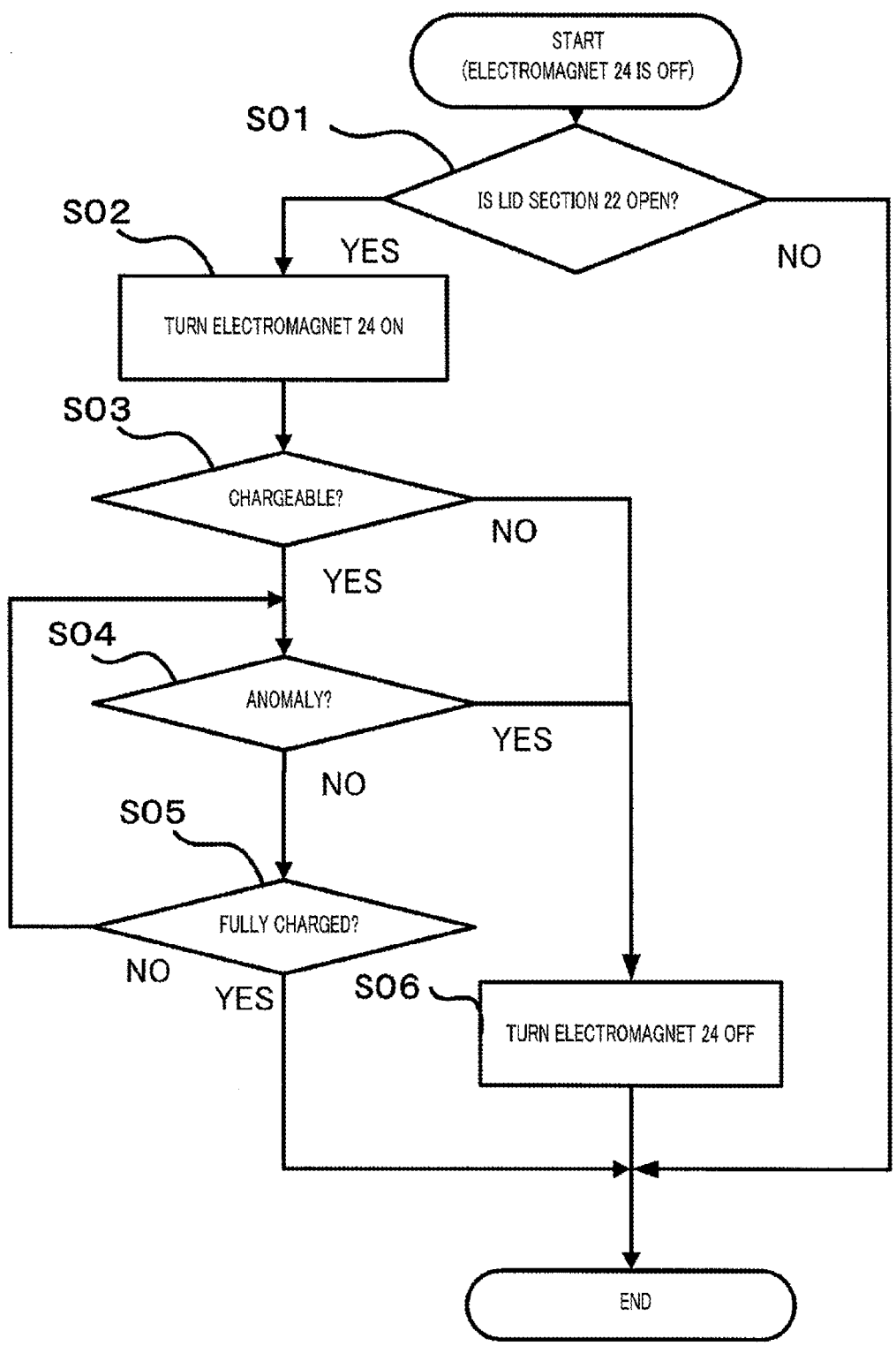
FIG. 8 is a diagram showing an operation of an electric vehicle charging apparatus with respect to Embodiment 2 of the present invention.

An electric vehicle charging apparatus with respect to Embodiment 2 of the present invention is described below with reference to FIGS. 4 through 8. FIGS. 4 through 6 are diagrams showing the structure of an electric vehicle charging apparatus with respect to Embodiment 2 of the present invention. FIG. 4 is a diagram showing the structure of each section of an electric vehicle charging apparatus with respect to Embodiment 2 of the present invention. FIG. 5 is a diagram showing the structure of each section of an electric vehicle charging apparatus in the middle of charging with respect to Embodiment 2 of the present invention. FIG. 6 is a diagram showing the structure of an electric vehicle charging apparatus with respect to Embodiment 2 of the present invention where connectors have broken off from each other. FIG. 7 is a block diagram of an electric vehicle charging apparatus with respect to Embodiment 2 of the present invention. FIG. 8 is a chart showing an operation of an electric vehicle charging apparatus with respect to Embodiment 2 of the present invention.

Elements with like features as those of Embodiment 1 are designated with like reference numerals, while descriptions thereof are omitted, and only points where they differ are described in detail.

A difference between Embodiment 1 and Embodiment 2 lies in the fact that while, with Embodiment 1, a repulsion force with such a directionality as to cause feeder connector 3 and vehicle-side connector 2 to break off from each other is generated by means of spring 34, with Embodiment 2, a repulsion force with such a directionality as to cause feeder connector 3 and vehicle-side connector 2 to break off from each other is generated by means of a magnetic repulsion force.

As shown in FIG. 4, vehicle-side connector 2 includes vehicle-side permanent magnet 23, and feeder connector 3 includes feeder-side permanent magnet 37. Vehicle-side permanent magnet 23 and feeder-side permanent magnet 37 are disposed in such a manner that when feeder connector 3 and vehicle-side connector 2 are connected, like poles face each other.

By so disposing them, when feeder connector 3 is inserted into vehicle-side connector 2, vehicle-side permanent magnet 23 and feeder-side permanent magnet 37 generate a repulsion force with such a directionality as to cause feeder connector 3 and vehicle-side connector 2 to break off from each other. Vehicle-side permanent magnet 23 and feeder-side permanent magnet 37 correspond to a repulsion force generation section.

Since a repulsion force with such a directionality as to cause feeder connector 3 and vehicle-side connector 2 to break off from each other is at work, if one were to try to insert feeder connector 3 into vehicle-side connector 2 in this state to feed power to the vehicle, this would not be possible due to their repelling each other. As such, vehicle-side connector 2 includes electromagnet 24.

When feeder connector 3 and vehicle-side connector 2 are connected, electromagnet 24 generates a magnetic force in such a manner that the opposite pole to the poles of vehicle-side permanent magnet 23 and feeder-side permanent magnet 37 so disposed as to face each other is located on the side of electromagnet 24 where feeder connector 3 is.

By way of example, if vehicle-side permanent magnet 23 and feeder-side permanent magnet 37 are so disposed that their S-poles face each other, electromagnet 24 generates a magnetic field in such a manner that the N-pole is in the direction where feeder-side permanent magnet 37 is located. On the other hand, if vehicle-side permanent magnet 23 and feeder-side permanent magnet 37 are so disposed that their N-poles face each other, electromagnet 24 generates a magnetic field in such a manner that the S-pole is in the direction where feeder-side permanent magnet 37 is located.

This magnetic field is so set that the force with which electromagnet 24 attracts feeder-side permanent magnet 37 is greater than the repelling force between vehicle-side permanent magnet 23 and feeder-side permanent magnet 37.

As shown in FIG. 4, it is preferable that the magnetic pole of electromagnet 24 be coplanar with the magnetic pole of vehicle-side permanent magnet 23 that faces feeder-side permanent magnet 37. This is because it makes it easier for the electromagnetic force generated by electromagnet 24 to act on feeder-side permanent magnet 37.

Thus, it becomes possible to insert feeder connector 3 into vehicle-side connector 2. Electromagnet 24 is controlled by controller section 42, which is described hereinbelow.

Electromagnet 24 is turned off by controller section 42 in the event of an anomaly during charging. As a result, vehicle-side connector 2 and feeder connector 3 break off from each other due to the repelling force. It is possible to provide feeder connector 3 with electromagnet 24. However, anomalies during charging in the context of the present embodiment result mostly from causes associated with vehicle 4, as in when the vehicle starts moving during charging, for example. Therefore, it is preferable that vehicle 4 be provided with electromagnet 24.

Shielding section 38 is a member for shielding feeder-side electrode 30 of feeder connector 3 so that it does not become exposed after feeder connector 3 and vehicle-side connector 2 have broken off from each other. Shielding section 38 may include an actuating mechanism (e.g. an electric motor, and/or the like) and automatically carry out shielding by sensing a break off between feeder connector 3 and vehicle-side connector 2, or it may automatically carry out shielding by means of a spring force, and/or the like, without using electric energy.

Next, functional blocks of vehicle 4, which includes vehicle-side connector 2 and of charging stand 5, which includes feeder connector 3, are described with reference to FIG. 7.

Vehicle 4 includes vehicle-side connector 2. The AC electric energy received at this vehicle-side connector 2 is converted into DC electric energy at charger 40, and stored in battery 41.

Vehicle-side connector 2 includes lid section 22, which can be detached by the user and is for covering vehicle-side electrode 20. The user initiates charging by opening lid section 22, and then inserting feeder connector 3.

Vehicle 4 also includes controller section 42, which controls each section, and vehicle information collection section 43, which collects various information within the vehicle. Charging stand 5 includes feeder connector 3, which feeds power to vehicle-side connector 2. AC electric energy is supplied to feeder connector 3 from feeding section 50, which is connected to a commercial power source. Each section is described in detail below.

Battery 41 stores DC electric energy that is outputted by charger 40. The stored electric energy is used as energy for driving a driving motor that is linked to, and rotates, the axle of the driving wheels of the electric vehicle. By way of example, nickel-hydrogen batteries and lithium-ion batteries may be used for battery 41.

Controller section 42 obtains from charger 40 information regarding charging, as well as various information within vehicle 4 from vehicle information collection section 43. Based on the information above, controller section 42 controls the turning on/off of electromagnet 24.

This controller section 42 corresponds to a disengagement detection section, and detects disengagement between feeder connector 3 and vehicle-side connector 2 when the travel speed of the vehicle changes from zero to a positive speed, as will he discussed hereinbelow.

The various information of vehicle 4 mentioned above refers to, for example, the travel speed of the vehicle. Further, vehicle information collection section 43 detects the state of lid section 22 (e.g., whether or not it is opened), and sends the detection result to controller section 42.

Controller section 42 may include a CPU, ROM, RAM, and/or the like. By executing a program stored on ROM (not shown), the CPU performs various operations, the outputting of control signals, and/or the like. In addition, the CPU and MPU use the RAM as a working area while running the program. Detailed operations are described hereinbelow.

Charging stand 5 includes feeder connector 3, which feeds power to vehicle-side connector 2 as discussed above. AC electric energy is supplied to feeder connector 3 from feeding section 50, which is connected to a commercial power source. A typical example of charging stand 5 is an EV charging stand installed solely for that purpose, but its installation location is not limited in any way.

By way of example, in addition to dedicated EV charging stands, it may be installed at ordinary houses, at housing complexes (e.g., condominiums), shops (e.g., convenience stores), gas stations, and/or the like.

FIG. 5 depicts a state where battery 41 of vehicle 4 is being charged from charging stand 5. Vehicle-side connector 2 and feeder connector 3 are connected with each other. At this point, controller section 42 has electromagnet 24 turned on (a magnetic field is generated).

Because of vehicle-side permanent magnet 23 and feeder-side permanent magnet 37, there is generated between feeder connector 3 and vehicle-side connector 2 a repulsion force with a repelling directionality. This repulsion force, as viewed in relation to vehicle 4, is represented by arrow E in FIG. 5. With respect to this repulsion force, as electromagnet 24 is turned on, there is generated a force that attracts, as viewed in relation to vehicle 4, feeder connector 3 in the direction of arrow F, which is in the opposite direction to arrow E. By having arrow E and arrow F cancel each other out, it is possible to smoothly connect feeder connector 3 and vehicle-side connector 2.

Furthermore, as shown in FIG. 6, if vehicle-side connector 2 and feeder connector 3 break off from each other due to an abnormal state, such as vehicle 4 starting to move during charging, and/or the like, controller section 42 turns electromagnet 24 off (no magnetic field is generated).

Thus, the repulsion force occurring between vehicle-side permanent magnet 23 and feeder-side permanent magnet 37 is released, and feeder connector 3 breaks off forcefully. The force at this point, as viewed in relation to vehicle 4, is represented by arrow G in FIG. 6. In conjunction with this break off, shielding section 38 shields feeder-side electrode 30.

With respect to an electric vehicle charging apparatus thus configured, a processing operation thereof is described with reference to FIG. 8. FIG. 8 is a chart illustrating an operation of an electric vehicle charging apparatus (an operation of controller section 42) with respect to Embodiment 2 of the present invention.

Upon beginning processing, controller section 42 determines, based on an output from vehicle information collection section 43, whether or not lid section 22 is open (S01). If lid section 22 is not open (NO at S01), controller section 42 terminates processing since charging will never be initiated as such.

On the other hand, if lid section 22 is open (YES at S01), controller section 42 controls electromagnet 24 so as to turn it on (S02).

Following S02, controller section. 42 determines whether or not charging from charging stand 5 is possible (S03). If charger 40 is accepting power, that information is sent to controller section 42. At this point, controller section 42 makes a determination that charging is possible. If charging is not possible (NO at S03), controller section 42 executes S06, which is described hereinbelow.

When lid section 22 is detached, controller section 42 turns electromagnet 24 on. Since charging is never initiated when lid section 22 is attached, turning electromagnet 24 on results in electric energy being consumed. As such, by turning electromagnet 24 on once lid section 22 is detached (i.e., when it is likely that charging will take place), there is produced an advantageous effect where it is possible to minimize the current passed through electromagnet 24.

If charging is possible (YES at S03), the charging of battery 41 begins via charger 40. While this charging is taking place, controller section 42 monitors for anomalies (S04).

If no anomaly is occurring (NO at S04), controller section 42 acquires from charger 40 information as to whether or not battery 41 is fully charged (S05). If it is not fully charged (NO at S05), controller section 42 returns the process to S04, and continues to monitor for anomalies.

Once battery 41 becomes fully charged (YES at S05), controller section 42 terminates the process. At this point, electromagnet 24 is turned on. However, as shown in FIG. 5, since the repelling force between vehicle-side permanent magnet 23 and feeder-side permanent magnet 37 is cancelled out by the magnetic field of electromagnet 24, the user is able to cause disengagement with ease by pulling on feeder connector 3.

It is also possible to have the magnetic field of electromagnet 24 be slightly stronger than the repelling force between vehicle-side permanent magnet 23 and feeder-side permanent magnet 37 (i.e., stronger in the direction that causes feeder-side permanent magnet 37 to be pulled towards the vehicle). Thus, when inserting feeder connector 3 into vehicle-side connector 2, feeding connector 3 is attracted towards the vehicle, thereby producing an advantageous effect where insertion by the user is made easier.

If an anomaly occurs during charging (YES at S04), controller section 42 turns electromagnet 24 off (S06). Thus, the repelling force occurring between vehicle-side permanent magnet 23 and feeder-side permanent magnet 37 is released, and feeder connector 3 breaks off forcefully.

The term "anomaly" as used above refers to, for example, a case where the vehicle starts moving during charging. If the travel speed detected by vehicle information collection section 43 changes from 0 km/h to a value other than 0 km/h, controller section 42 is able to determine that the vehicle has started moving. Thus, when the travel speed changes from zero to a positive speed, controller section 42 detects disengagement between feeder connector 3 and vehicle-side connector 2, and effects control in such a manner as to stop the electromagnetic force generated by electromagnet 24.

After terminating the process, controller 42 once again returns the process to Start.

(Variation)

With the present embodiment, it has been described that vehicle-side connector 2 includes vehicle-side permanent magnet 23 and electromagnet 24. However, the present invention is by no means limited as such. Vehicle-side connector 2 may instead include just electromagnet 24, and be without vehicle-side permanent magnet 23.

Figure 9:
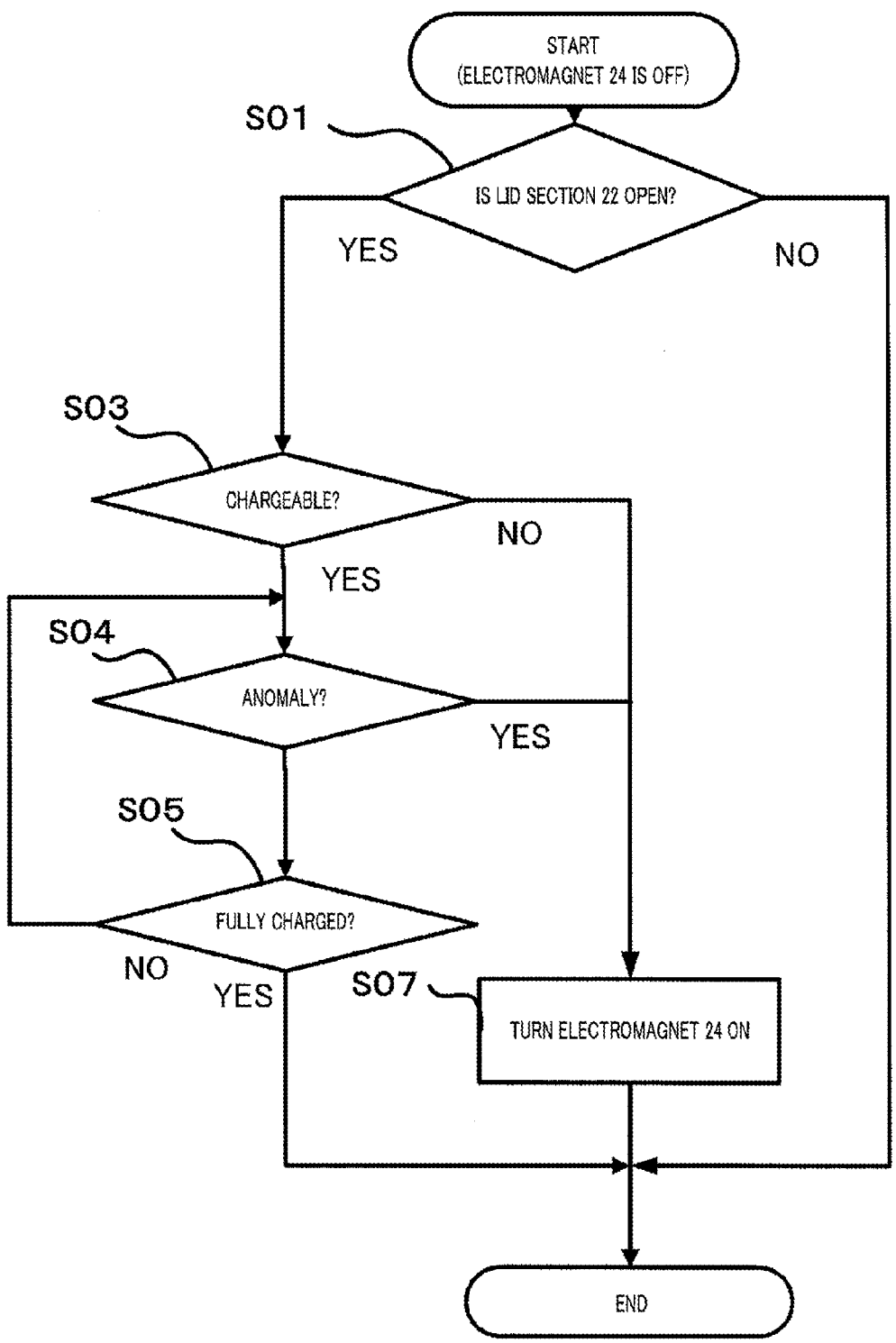
FIG. 9 is a diagram showing an operation of an electric vehicle charging apparatus with respect to a variation of Embodiment 2 of the present invention.

FIG. 9 is a chart showing an operation of an electric vehicle charging apparatus with respect to a variation of Embodiment 2 of the present invention. When the arrangement above is adopted, controller section 42 does not perform S02 in FIG. 8. This is because, since vehicle-side connector 2 does not include vehicle-side permanent magnet 23, there is no need to generate a magnetic field to cancel out the repelling force between vehicle-side permanent magnet 23 and feeder-side permanent magnet 37.

If an anomaly occurs during charging (YES at S04), controller section 42 turns electromagnet 24 on (S07) in this variation, in contrast to how it turned electromagnet 24 off at S06 in FIG. 8. At this point, the magnetic field generated by electromagnet 24 is made to be such that it has the opposite pole to the pole that would cause feeder-side permanent magnet 37 to be attracted towards vehicle-side connector 2. Due to this magnetic field generated by electromagnet 24, electromagnet 24 and feeder-side permanent magnet 37 repel each other, thus causing vehicle-side connector 2 and feeder connector 3 to break off from each other. In other words, with this variation, electromagnet 24 and feeder-side permanent magnet 37 correspond to a repulsion force generation section.

Thus, with an electric vehicle charging apparatus of Embodiment 2, a repulsion force with such a directionality as to cause feeder connector 3 and vehicle-side connector 2 to break off from each other is venerated by means of a magnetic repulsion force, thereby causing feeder connector 3 and vehicle-side connector 2 to break off from each other forcefully. Such an arrangement produces an advantageous effect where it is possible to prevent the occurrence of an arc discharge.

With the present embodiment, at S03, an anomaly determination is made when the travel speed detected by vehicle information collection section 43 changes from 0 km/h to a value other than 0 km/h. However, it is conceivable that the travel speed detected by vehicle information collection section 43 may sometimes become inaccurate. By way of example, a case where a very low speed value other than 0 km/h is indicated even though the vehicle is stationary in reality is conceivable. In this case, if the connectors were to be disengaged by turning electromagnet 24 off, when in fact the vehicle is stationary, it could pose a threat if there are any people nearby.

As such, when the travel speed detected by vehicle information collection section 43 is at or below a predetermined value (preferably a very low speed value), even if it is a value other than 0 km/h, it is preferable that an anomaly determination not be made if at least one of the following conditions are met The conditions mentioned above include such conditions as, for example, the activation key of the drive motor not being turned, the absence of a shift maneuver (the gear being in neutral or park), the parking brake not being released, and so forth. These are detected by vehicle information collection section 43. By further adding such conditions, an advantageous effect is produced where it is possible to prevent erroneous anomaly occurrence determinations.

The disclosure of the specification, drawings, and abstract included in Japanese Patent Application No. 2010-235335, filed on Oct. 20, 2010, is incorporated herein by reference in its entirety.

INDUSTRIAL APPLICABILITY

The present invention is effective as, for example, an electric vehicle charging apparatus including a vehicle-side connector for battery charging, and a feeder connector that supplies electric energy from outside of a vehicle,

REFERENCE SIGNS LIST

1 Electric vehicle charging apparatus
2 Vehicle-side connector
20 Vehicle-side electrode
21 Hole part
22 Lid section
23 Vehicle-side permanent magnet
24 Electromagnet
3 Feeder connector
30 Feeder-side electrode
300 Shielding section
31 Charging cable
32 Latch section
320 Hole
321 Latch stop
322 Latch stop
323 Protrusion
33 Protruding section
330 Hole
331 Support section
34 Spring
35 Base section
36 Feeder connector housing
360 Protrusion
361 Latch release section
37 Feeder-side permanent magnet
38 Shielding section
4 Vehicle
40 Charger
41 Battery
42 Controller section
43 Vehicle information collection section
5 Charging stand
50 Feeding, section

The invention claimed is:

1. An electric vehicle charging apparatus comprising:
a feeder connector that connects with a vehicle-side connector of an electric vehicle from outside of the electric vehicle and supplies electric energy;
a repulsion force generation section that generates a repulsion force with such a directionality as to cause the feeder connector and the vehicle-side connector to break off from each other;
an engaging mechanism that stores the repulsion force generated by the repulsion force generation section without releasing the generated repulsion force;
a latch release section that disconnects the feeder connector from the vehicle-side connector by being pressed; and
a disconnection detection mechanism that detects that the feeder connector is disconnected from the vehicle-side connector while the latch release section has not been pressed, wherein
when the disconnection detection mechanism has detected that the feeder connector is disconnected from the vehicle-side connector, the engaging mechanism is disabled to release the repulsion force, thereby causing the feeder connector and the vehicle-side connector to break off from each other by the repulsion force, and
when the latch release section has been pressed, the engaging mechanism prevents the repulsion force from being released.

2. The electric vehicle charging apparatus according to claim 1, further comprising a shielding section that prevents a feeder-side electrode of the feeder connector from being exposed after the feeder connector and the vehicle-side connector have broken off from each other due to the repulsion force of the repulsion force generation section.

3. The electric vehicle charging apparatus according to claim 1, wherein the feeder connector includes the repulsion force generation section and the disconnection detection mechanism.

4. The electric vehicle charging apparatus according to claim 1, wherein the repulsion force generation section generates the repulsion force by means of a spring force or hydraulics.

5. The electric vehicle charging apparatus according to claim 1, wherein:
- the feeder connector includes the disconnection detection mechanism;
- the disconnection detection mechanism includes a latch section having a latch stop that mutually engages the feeder connector and the vehicle-side connector; and
- when the feeder connector and the vehicle-side connector have broken off from each other while the latch release section has not been pressed, the engagement by the latch section becomes released, as a result of which the disconnection of the feeder connector from the vehicle-side connector is detected.

6. An electric vehicle charging apparatus comprising:
- a feeder connector that connects with a vehicle-side connector of an electric vehicle from outside of the electric vehicle and supplies electric energy;
- a repulsion force generation section that generates a magnetic repulsion force with such a directionality as to cause the feeder connector and the vehicle-side connector to break off from each other;
- a magnetic force generation section that generates a magnetic force with such a directionality as to cause the feeder connector and the vehicle-side connector to attract each other; and
- a control section that controls the magnetic force generation section and that detects an anomaly during the supply of the electric energy, wherein the control section causes the magnetic force generation section to generate the magnetic force in the attracting direction to cancel out the repulsion force when the anomaly during the supply of the electric energy is not detected, and causes the feeder connector and the vehicle-side connector to break off from each other by the repulsion force, without causing the magnetic force generation section to generate the magnetic force in the attracting direction, when the anomaly during the supply of the electric energy has been detected.

7. The electric vehicle charging apparatus according to claim 6, further comprising a shielding section that prevents a feeder-side electrode of the feeder connector from being exposed after the feeder connector and the vehicle-side connector have broken off from each other due to the repulsion force of the repulsion force generation section.

8. The electric vehicle charging apparatus according to claim 6, wherein:
- the repulsion force generation section comprises permanent magnets provided with the feeder connector and the vehicle-side connector; and
- the magnetic force generation section comprises an electromagnet provided with the vehicle-side connector.

9. The electric vehicle charging apparatus according to claim 8, wherein the control section controls the magnetic force generation section based on vehicle information of the electric vehicle.

10. The electric vehicle charging apparatus according to claim 9, wherein the control section acquires a travel speed of the electric vehicle as the vehicle information, and detects the anomaly during the supply of the electric energy when the travel speed has changed from zero to a positive speed.

\* \* \* \* \*